United States Patent Office 3,504,320
Patented Mar. 31, 1970

3,504,320
LINEARLY ACTING CURRENT FORCE TRANSDUCER
Jean Engdahl and Raymond Huguenin, Neuchatel, Switzerland, assignors to Ebauches S.A., Neuchatel, Switzerland, a Swiss company
Filed Nov. 19, 1968, Ser. No. 777,058
Claims priority, application Switzerland, Nov. 30, 1967, 16,878/67
Int. Cl. H01f 21/00, 21/06, 7/08
U.S. Cl. 336—110        3 Claims

ABSTRACT OF THE DISCLOSURE

Current-force transducer acting linearly between an electric current and a core characterized by the fact that on the one hand the current passes in a composite coil comprising a main coil flanked at each end by a recovery coil, these two recovery coils being connected in series but in opposition, with the main coil and that on the other hand the core is also complex and has a central cross beam flanked at each end by a permanent magnet, these two magnets having opposite poles and being located approximately perpendicularly to separations between the main coil and the recovery coils.

---

There are already known various devices used in particular in certain measuring circuits and in particular for dynamometric applications which make it possible to eestablish a ratio between an electrical current and a force.

While it is rather easy to obtain a simple function for this relation, it is however much more difficult to obtain a sufficient linearity between the two variables of the function.

The simplest device consists in a coil through which passes current and a core of soft iron subjected to the action of the force under consideration and which moves under the action of this force along the axis of the coil.

In this device, the force depending upon the induction in the core, its variation in function of the current is not linear for, for no metal, does the induction vary proportionally with the field.

A similar device, in which the soft iron core is replaced by a permanent magnet makes it possible to avoid this drawback, for if the magnet is of good quality, it is practically in saturation owing to its residual magnetism and its coefficient of magnetic permeability is close to 1. The direction of the force depends upon the direction of the current but the system is not symmetrical.

The present invention has for its object a current force tranducer acting linearly between the intensity of an electrical current and the force exerted on a core and has for its purpose to remedy these drawbacks.

This device is characterized by the fact that on the one hand the said current passes in a composite coil comprising a main coil flanked on each extremity by a recovery coil, these two recovery coils being connected in series, but in opposition, with the main coil, and that on the other hand, said core is also composite, comprising a central cross beam flanked at each end by a permanent magnet, these two magnets having opposite poles and being located approximately perpendicularly to the separations between the main coil and the recovery coils.

The accompanying drawing represents by way of example one embodiment of the object of the invention.

Figure 1:
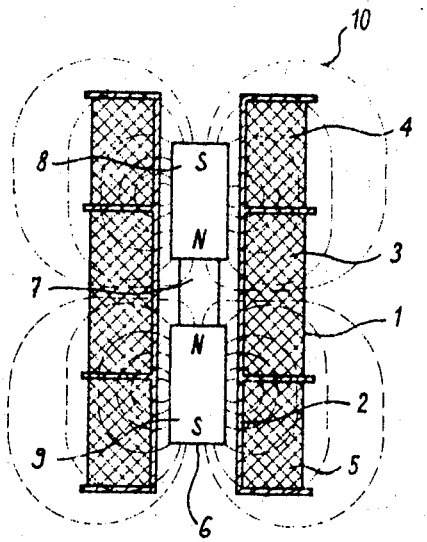
Figure 2:
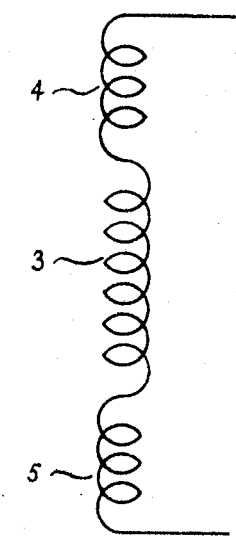

FIGURE 1 is a cross section of the device while FIGURE 2 shows schematically a part of the electrical circuit embodying the coil.

In FIGURE 1 the composite coil 1 is constituted by three elements, wound on the same support 2. The central coil 3 is extended on each side by a recovery coil 4, 5, respectively, the direction of winding of coils 4 and 5 being opposite to that of coil 3.

The composite core 6 moves within the centre of coil 1 and coaxially therewith. It is constituted by a connecting member 7, connected end to end but at a certain distance one from the other, two permanent magnets 8 and 9, their respective poles being opposite. The induced magnetic field lines are shown schematically by the dotted lines 10.

A concentrated magnetic flux produced by the two permanent magnets 8 and 9 passes through the main coil 3. If the same is passed through by a current there will be a force created which is oriented upwardly or downwardly according to the direction of the curent.

Owing to the judicious position of the permanent magnets relative to the coils, in particular by the fact that they are located almost perpendicular to the partitions separating the main coil from the recovery coils, practically the entire flux passes through the latter. These being connected in series with the main coil, but in the opposite direction, the force is added to that produced by the main coil, since the magnetic flux is also inverted.

The linearity obtained with such a device is several per thousand in a range of forces varying from 1 to 1000.

What is claimed is:

1. A current-force transducer acting linearly between the intensity of an electric current and the force exerted on a core, comprising a composite coil including a main coil, a recovery coil on either side of said main coil, the recovery coils being connected in series, but in opposition with said main coil, partitions separating said main coil and said recovery coils, a composite core movable within said main coil and coaxially therewith, said core consisting of a support and a pair of permanent magnets connected by said support, said magnets having opposite respective poles, said magnets being positioned approximately perpendicular to said separations between said main coil and said recovery coils.

2. Transducer according to claim 1, wherein the three coils are wound on the same support.

3. Transducer according to claim 1, wherein said main coil is wound in the direction opposite to that of the other coils.

References Cited

UNITED STATES PATENTS

| | | | |
|---|---|---|---|
| 341,981 | 5/1886 | Woolson | 335—229 |
| 2,959,747 | 11/1960 | Challacombe et al. | 310—15 XR |
| 3,086,469 | 4/1963 | Musgrave | 310—15 XR |
| 3,105,153 | 9/1963 | James | 310—15 XR |
| 3,153,935 | 10/1964 | Karlson | 336—110 XR |

THOMAS J. KOZMA, Primary Examiner

U.S. Cl. X.R.
310—15; 335—229; 336—136